May 31, 1960 M. TRESHOW 2,938,845
SUPERHEATING IN A BOILING WATER REACTOR
Filed April 25, 1957 4 Sheets-Sheet 1
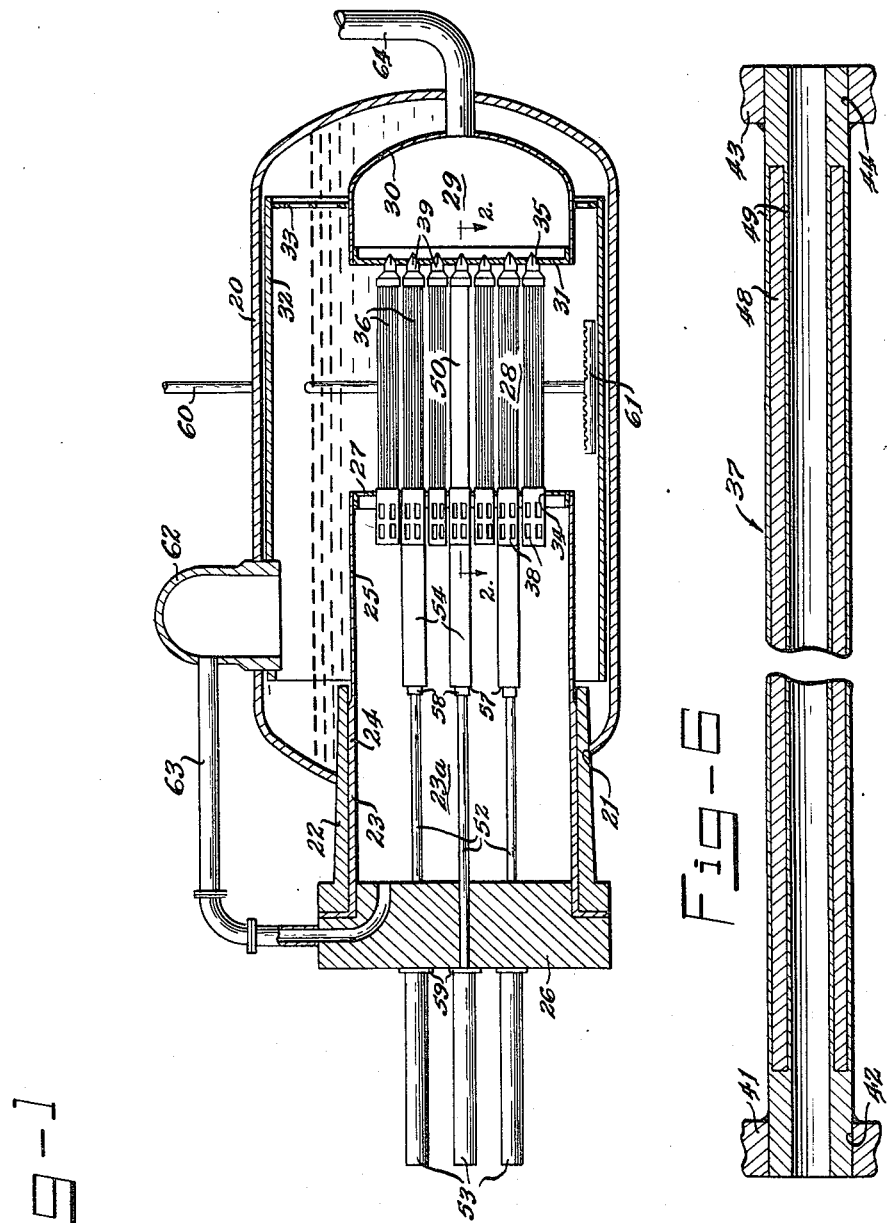
INVENTOR.
Michael Treshow
BY
Roland A. Anderson
Attorney

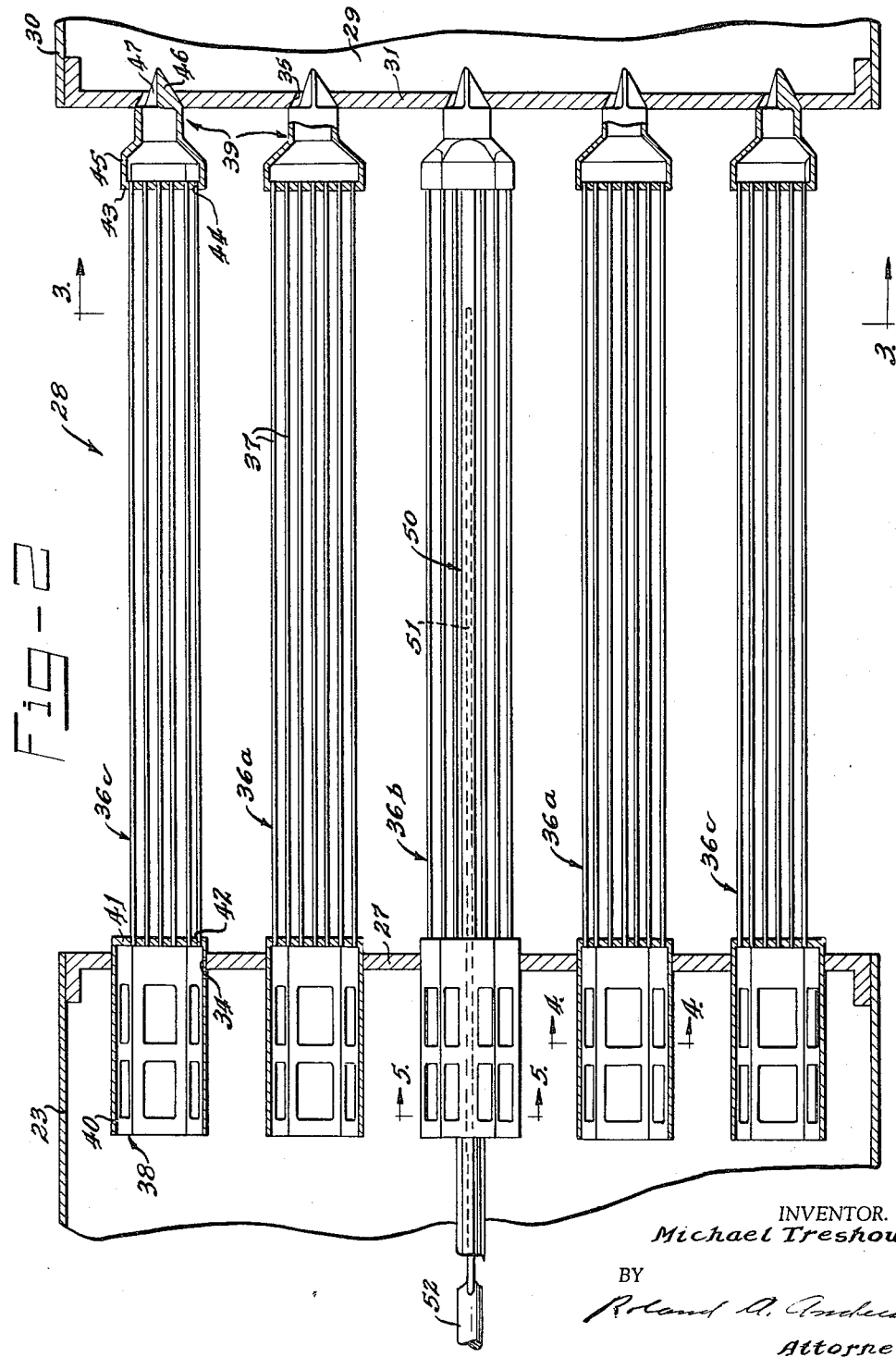

May 31, 1960 M. TRESHOW 2,938,845
SUPERHEATING IN A BOILING WATER REACTOR
Filed April 25, 1957 4 Sheets-Sheet 3
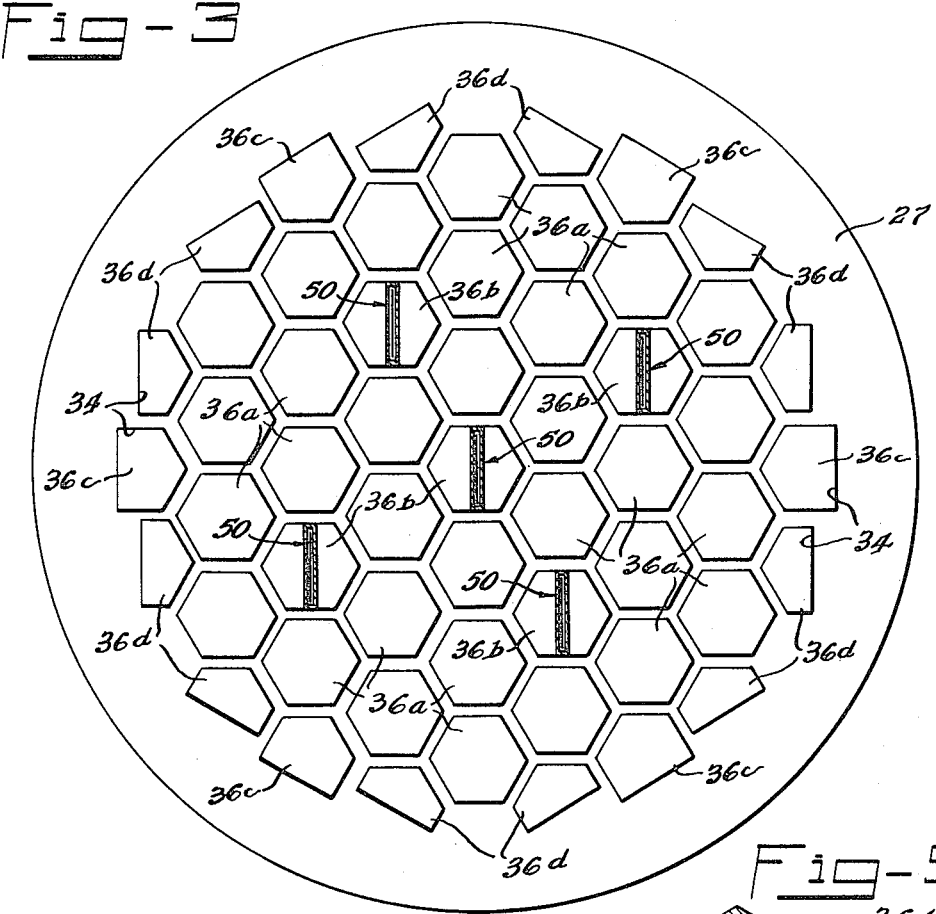
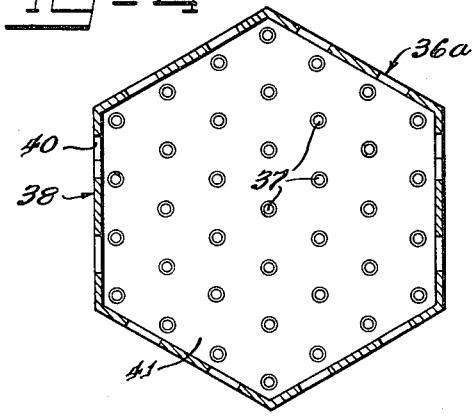
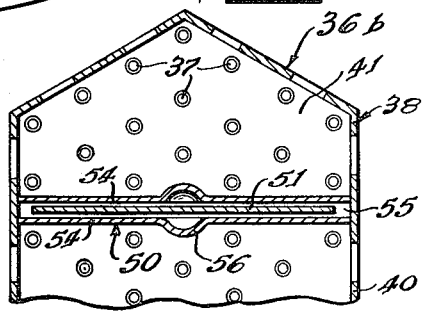
INVENTOR.
Michael Treshow
BY
Attorney May 31, 1960 M. TRESHOW 2,938,845
SUPERHEATING IN A BOILING WATER REACTOR
Filed April 25, 1957 4 Sheets-Sheet 4
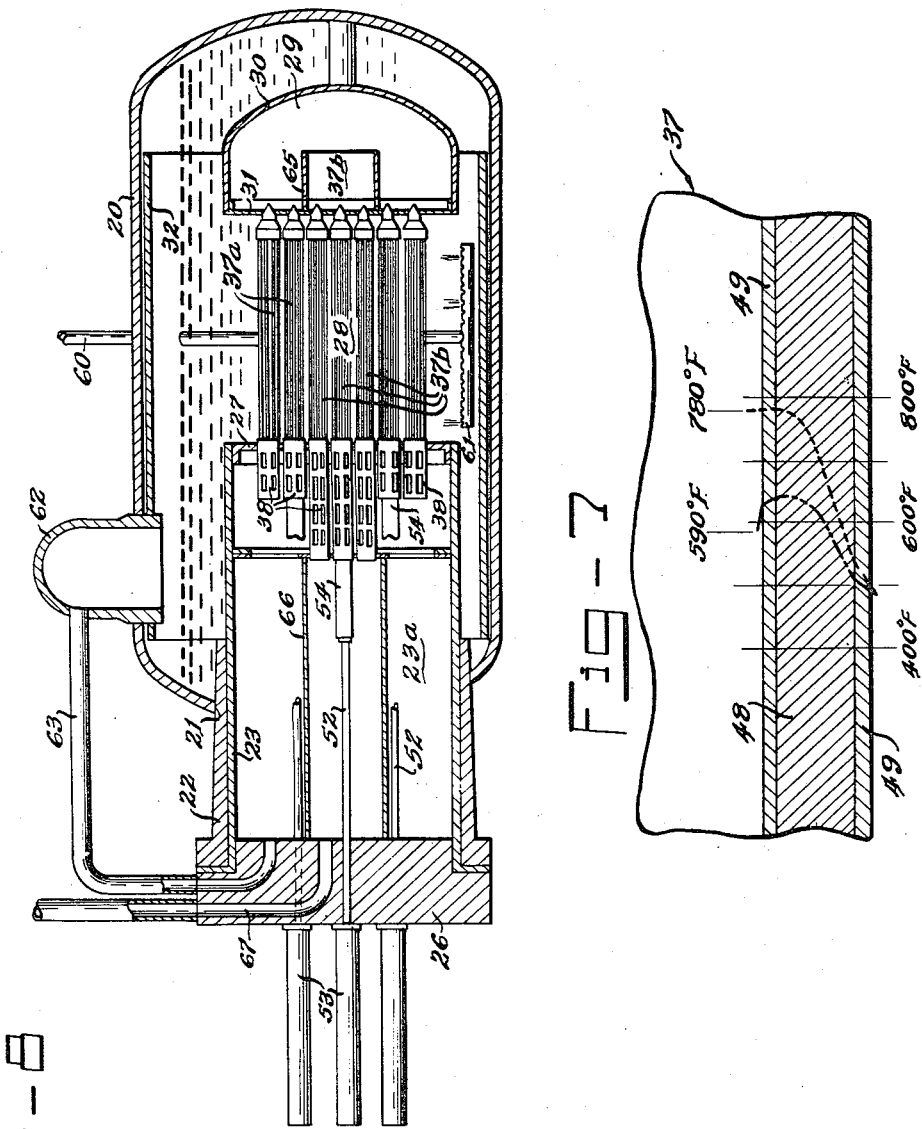
INVENTOR.
Michael Treshow
BY
Attorney

United States Patent Office 2,938,845
Patented May 31, 1960

2,938,845

SUPERHEATING IN A BOILING WATER REACTOR

Michael Treshow, Hinsdale, Ill., assignor to the United States of America as represented by the United States Atomic Energy Commission Filed Apr. 25, 1957, Ser. No. 655,155

10 Claims. (Cl. 204—154.2)

This invention relates to a nuclear reactor and more particularly to a direct-cycle boiling-water nuclear reactor which generates superheated steam within the reactor core.

A direct-cycle boiling-water nuclear reactor is one in which fissioning of a nuclear fuel produces heat which boils water contained within the core of the reactor. The steam formed thereby may be conveyed to a turbogenerator to generate electricity.

U.S. patent application Serial No. 518,427, filed June 28, 1955, on behalf of Samuel Untermyer, describes in detail a direct-cycle boiling-water nuclear reactor. This reactor, however, generates saturated steam within the reactor core.

In the present state of power plant technology, the use of saturated steam to drive a turbine would be extremely inefficient. In modern conventional central-power plants superheated steam is invariably employed since the thermal efficiency of the turbine increases with an increase in steam temperature. Combustion fired superheaters are employed to increase the temperature of the steam delivered to the turbine.

It has been suggested in U.S. patent application Serial No. 649,408, filed February 21, 1946, on behalf of Herbert E. Metcalf, now Patent No. 2,787,593, issued April 2, 1957, and U.S. application Serial No. 769,301, filed August 18, 1947, on behalf of Eugene P. Wigner, now Patent No. 2,806,820, issued September 17, 1957, that steam produced as a result of the heat of a reactor be superheated by passing it through the reactor core. The systems described are not as efficient steam producers as is the boiling-water reactor since the steam is produced outside of the core of the reactor by flashing water into steam.

It obviously would be desirable to superheat the steam obtained from a boiling-water reactor for the aforementioned reasons but this cannot be done by merely returning the steam formed in the core of the reactor through coolant channels in the core of the reactor since the temperature available is only that of boiling water.

It is accordingly the object of the present invention to construct a direct-cycle boiling-water nuclear reactor which produces superheated steam.

I have found it is possible to produce superheated steam in a boiling-water reactor by taking advantage of the poor heat conductivity of uranium. In accordance with this invention fuel elements are employed to heat water to the boiling point and at the same time to superheat the resultant steam. Superheated steam is obtained in a nuclear reactor which comprises a core containing tubular fuel elements, means for passing water in heat exchange relationship with the outside of the fuel elements under conditions whereby steam is formed, and means for directing the resultant steam through the interior of the fuel elements.

The terms "water" and "steam" as used throughout the specification and claims will be understood to include both hydrogen oxide ($H_2O$) and deuterium oxide ($D_2O$). The term "materials fissionable by neutrons of thermal energy" includes but is not restricted to $U^{233}$, $U^{235}$ and $Pu^{249}$.

The invention will now be described with reference to the accompanying drawings wherein Fig. 1 is a vertical cross sectional view of a nuclear reactor constructed according to the present invention;

Fig. 2 is a horizontal cross sectional view through the core of the reactor taken on the line 2—2 of Fig. 1;

Fig. 3 is a vertical cross sectional view through the core of the reactor taken on the line 3—3 of Fig. 2;

Fig. 4 is a cross sectional view of a single fuel unit taken along the line 4—4 of Fig. 2;

Fig. 5 is a cross sectional view of a special type fuel unit taken along the line 5—5 of Fig. 2;

Fig. 6 is a cross sectional view of a fuel element;

Fig. 7 is a diagram showing temperature variations across a fuel tube; and

Fig. 8 is a somewhat diagrammatic view of a modification according to the present invention.

The reactor constructed according to the present invention comprises a horizontal pressure vessel 20 which has an opening 21 at one end. Opening 21 is off-center with respect to the center line of the reactor being relatively close to the bottom of the pressure vessel 20. A cylindrical housing 22 fits closely within the opening 21 and extends a short distance into the pressure vessel 20. A cylindrical shell 23 is disposed within the cylindrical housing 22 and defines a steam chest 23a. Cylindrical shell 23 includes a portion 24 which is approximately the same length as the housing 22 and a thinner portion 25 which extends well into the pressure vessel 20. A closure 26 is disposed within the end of the housing 22 and acts as a cover for the steam chest 23a. Cylindrical shell 23 carries a support plate 27 for the core 28 of the reactor at the innermost end thereof. A plenum chamber 29 at the far end of the pressure vessel 20 from the opening 21 is defined by a cup-shaped plate 30 and a second support plate 31 for the core 28 of the reactor. The plenum chamber 29 is supported by and spaced from a thermal shield 32 by a support member 33. Thermal shield 32 is supported by and spaced from pressure vessel 20 by spacer members (not shown).

In one particular construction of the nuclear reactor which will be used to illustrate the present invention throughout the specification, the pressure vessel is 11'4" in length and 5'6" in diameter. The pressure vessel is constructed of stainless steel as are other structural elements within the reactor unless otherwise specified. Pressure vessel 20 is designed to withstand pressure up to 800 lbs. per square inch, and is intended to be operated at a pressure of 600 lbs. per square inch. The reactor is designed to deliver 31,600 kilowatts of power, produced in the form of 85,000 lbs./hr. of steam at 590° F.

Support plates 27 and 31 are 54" in diameter and spaced a distance of 59" apart. Each of support plates 27 and 31 contains a plurality of openings 34 and 35 respectively arranged in hexagonal array and spaced 6.55" apart center to center. The openings 34 in plates 27 are larger than openings 35 in plate 31.

The core 28 of the reactor is formed by a plurality of removable fuel units 36 which are supported by plates 27 and 31. The fuel units 36 are arranged within the core 28 of the reactor in hexagonal array as shown in Fig. 3. Each fuel unit 36 comprises a plurality of fuel tubes 37, an intake fitting 38 and a discharge fitting 39. Intake fittings 38 comprise a lattice construction 40 by which the fuel unit is handled and a tube sheet 41 containing openings 42.

Discharge fittings 39 likewise contain a tube sheet 43 having openings 44 which are aligned with and the same size as openings 42. Fuel tubes 37 are welded into openings 42 and 44. Tube sheet 43 forms one end of the discharge fitting 39 which has solid walls 45 and a conical tip 46 having an opening 47 therein. Tip 46 is seated within openings 35 in the second support plate 31 to place the interior of the discharge fittings 39 in communication with plenum chamber 29.

Fuel tubes 37 are shown in more detail in Fig. 6 and comprise a cylindrical tube 48 containing a material fissionable by neutrons of thermal energy and cladding 49 provided to protect the fuel from corrosion. Each tube 37 is 51 inches in length with an outside diameter of .600 inch. The walls of the tube are .125 inch in thickness and the tube has .025 inch of cladding on he outside and .020 inch of cladding on the inside. The cladding is zirconium. The fuel employed is an alloy of 80% uranium and 20% zirconium in which the uranium is enriched to 1.30% $U^{235}$.

Each fuel unit 36 is formed as an integral unit which may be inserted into and removed from the reactor core as a unit.

There are several different types of fuel units 36 known respectively as 36a, b, c and d. A complete fuel unit 36a includes 37 fuel tubes 37 as shown in Fig. 4. There are six of these units in the first row about the center of the core of the reactor and eighteen in the third row about the center. The second row contains eight of these fuel elements and four fuel units 36b in which three of the fuel tubes 37 have been removed to provide space for a control element 50 as shown in Fig. 5. In addition to these four fuel units 36b, the center fuel unit 36b is of this type.

To attain most efficient geometry the core 28 of the reactor simulates a cylinder. This in accomplished by using partial fuel units 36c and 36d. There are six fuel units 36c containing 34 fuel tubes 37 each centered in the six sides of the hexagonal array of fuel units. Likewise, fuel units 36d have 20 fuel tubes 37. There are twelve of these distributed symmetrically around the center of the core 28. There are accordingly 1798 fuel rods each of which contains 22.5 grams $U^{235}$ in the core of this reactor.

The reactor is controlled in conventional fashion by five control elements 50. These control elements comprise elongated slabs 51 of a material of high neutron capture cross section which may be rapidly inserted into or withdrawn from the reactor core. Slabs 51 are reciprocated by a rod 52, operated by a conventional control rod drive 53, between a pair of side plates 54 which extend across fuel unit 36b as shown in Fig. 5 to form a channel 55. Side plates 54 are approximately twice the length of slabs 51 so that channels 55 accommodate the slabs 51 in fully inserted and fully withdrawn positions. Plates 54 are flat when within the core of the reactor and extend through tube sheet 41 in this form. The extension of plates 54 includes a portion 56 designed to accommodate the rod 52. An end plate 57 prevents steam from entering channels 55. Rods 52 pass through a seal 58 in this end plate and a seal 59 in closure 26. Slab 51 is formed of a material having a high neutron capture cross section such as boron steel. An alloy containing 2% boron has been found satisfactory. Slab 51 and side plates 54 are .075 inch in thickness with a clearance of .075 inch therebetween. Slab 51 is 5.6 inches in width and 54 inches in length.

The reactor includes a water inlet pipe 60 which enters the pressure vessel 20 near the top thereof, circles the pressure vessel, and terminates in a distributor 61 near the bottom of the pressure vessel. By circling the periphery of the pressure vessel the feed water is preheated prior to being fed into the body of water within the pressure vessel. A steam dome 62 is located at the top of the pressure vessel 20 and steam accumulated therein is directed to steam chamber 23a by means of steam pipe 63 which enters pressure vessel 20 through closure 26. Plenum chamber 29 has an outlet pipe 64 for supersaturated steam which leads the supersaturated steam developed in the reactor core to a conventional steam-operated power plant. It will be appreciated that the reactor and associated equipment is provided with a biological shield as is conventional in the art.

In operation the fuel units are inserted in place within the core of the reactor through opening 21 in pressure vessel 20. The fuel units 36 are slid through openings 34 in support plate 27 until tip 46 seats itself in openings 35 in second support plate 31. After placing the cover in place, water is introduced through distributor 61 into the reactor to fill the reactor to a point above the top of the fuel elements. The reactor as described uses light water but it is obvious that heavy water can also be used. The control elements 50 are then operated in conventional manner to bring the reactor to criticality. The heat from the chain reaction causes the water to boil and the steam is collected in steam dome 62 and directed to steam chamber 23a. The steam in chamber 23a is saturated steam which passes through intake fittings 38 into the interior of fuel tubes 37. The steam is heated further within tubes 37 and passes into plenum chamber 29 as supersaturated steam.

It is evident that the fuel tubes 37 heat the water on the outside of the tubes to one temperature and at the same time heat the steam in the interior of the tubes to another higher temperature. This occurs because of the poor heat conductivity of uranium. Fig. 7 shows the temperature variations in the wall of the fuel tube. Curve 1 shows how the temperature varies across the fuel tube. The highest temperature is somewhere within the fuel tube wall near the interior of the tube. From this point the temperature drops off approaching the edges of the fuel tube but it drops off much more toward the outside of the tube than toward the inside. With a fuel tube of .600 inch in outside diameter and a .350 inch inside diameter with cladding .025 inch on inside and outside, the temperature at the outside of the fuel tube is 498° F. and the temperature at the interior of the tube is 638° F. The reason for the higher temperature at the interior surface is of course the fact that steam removes the heat therefrom at a much lower rate than does the water on the outside of the tube.

At the operating pressure of 600 lbs. per square inch water boils at 486° F. The temperature of the saturated steam is therefore 486° F. This saturated steam is then raised to a temperature of 590° F. when it passes through the interior of the fuel tubes. The temperature of the supersaturated steam can be increased by lengthening the tubes. The theoretically obtainable temperature is 780° F. as shown in curve 2 of Fig. 7.

The temperature of the supersaturated steam may also be increased by employing a two-pass system as illustrated in Fig. 8. Numbers applied in Fig. 8 are the same as those applied in Fig. 1 except where specifically mentioned below. This embodiment of the invention employs two groups of fuel tubes. Fuel tubes 37a are those tubes disposed about the periphery of the core of the reactor while fuel tubes 37b are those at the center of the reactor where heat generation is at a maximum. A cylindrical baffle 65 guides the steam from tubes 37a to tubes 37b and a cylindrical baffle 66 guides the steam from tubes 37b to a discharge pipe 67.

The steam thus makes two passes through the core of the reactor. The first pass is through the outer portion of the core while the second pass is through the inner portion. By this means the temperature of the steam may be increased to 700° F.

Other constructions may be employed to obtain superheated steam from a direct-cycle boiling-water nuclear reactor. One construction which may be employed includes a continuation of the boiling channels into the top reflector or blanket zone. In this case a vertical boiling reactor with vertical water passages is elongated by a factor greater than 1½ times the length that will produce a critical mass for any given radius. Leakage neutrons from the boiling critical zone produce some heat in the remainder of the core for superheating the steam rising from the boiling zone.

Another construction includes separate downcomer fuel tubes, located in a blanket or side reflector zone. In the latter case water will be admitted into the bottom of a tank containing nuclear fuel wherein it is changed to steam. The steam passes over the top of the tank and downward through a peripheral core region also containing a nuclear fuel wherein it is superheated.

It will be understood that this invention is not to be limited to the details given herein but that it may be modified within the scope of the appended claims.

What is claimed is:

1. A nuclear reactor comprising a pressure vessel containing a water inlet and a steam outlet, a mass of water disposed within the pressure vessel, a plurality of bodies of a material fissionable by neutrons of thermal energy disposed in the water, said bodies having a surface which is not in contact with the water, said reactor being operated under conditions of temperature and pressure such that the water in the pressure vessel is in the boiling state, means to separate steam from the water and means to conduct the steam from the steam outlet in heat exchange contact with the surface of the said bodies containing material fissionable by neutrons of thermal energy which is not in contact with the water.

2. The combination according to claim 1 wherein the material fissionable by neutrons of thermal energy is $U^{235}$.

3. A nuclear reactor comprising a core containing tubular fuel elements, means for passing water over the outside of the fuel elements under conditions whereby steam is formed and means for directing the resulting steam through the interior of the fuel elements.

4. A nuclear reactor comprising a pressure vessel, a mass of water disposed within the pressure vessel, a plurality of horizontal tubes containing a material fissionable by neutrons of thermal energy disposed in the water, said reactor being operated under conditions of temperature and pressure such that the water in the pressure vessel is in the boiling state, means for introducing water into the mass of water near the bottom thereof, a steam dome located at the top of the pressure vessel and means for directing steam from the steam dome through the said horizontal tubes.

5. The combination according to claim 4 wherein the means for introducing water comprises an inlet pipe located near the top of the pressure vessel, a pipe circling the pressure vessel, and a distributor located near the bottom of the reactor.

6. The combination according to claim 4 wherein the means for directing steam to the fuel tubes comprises a steam chest located at the inlet end of the fuel tubes and in communication therewith, and a pipe connecting the steam dome and the steam chest.

7. A direct-cycle boiling-water nuclear reactor comprising a pressure vessel containing a water inlet and a steam outlet, a mass of water disposed within the pressure vessel, a plurality of removable fuel units each consisting of a plurality of horizontal fuel tubes, an inlet fitting, and a discharge fitting disposed in the mass of water, said reactor being operated under conditions of temperature and pressure such that the water in the pressure vessel is in the boiling state, and means to direct steam from the steam outlet to the interior of the fuel tubes.

8. The combination according to claim 7 wherein the fuel units are arranged in hexagonal array and the fuel tubes are arranged in hexagonal array within the fuel units.

9. The combination according to claim 8 wherein five of the fuel units include a pair of plates defining a channel, and a control slab of a material of high neutron capture cross section slidably disposed in said channel.

10. A method of operating a boiling-water nuclear reactor comprising a pressure vessel containing a mass of water and a plurality of tubular fuel elements immersed in said mass of water with only the outer surface thereof in contact with the water, comprising initiating a chain reaction in the fuel, maintaining the temperature and pressure in the pressure vessel such that the water contained therein boils, separating the steam thus obtained from the water, and directing the steam through the center of the tubular fuel elements.

References Cited in the file of this patent

UNITED STATES PATENTS

| 2,778,792 | Szilard | Jan. 22, 1957 |
| 2,787,593 | Metcalf | Apr. 2, 1957 |
| 2,806,820 | Wigner | Sept. 17, 1957 |
| 2,861,033 | Treshow | Nov. 18, 1958 |

FOREIGN PATENTS

| 754,183 | Great Britain | Aug. 1, 1956 |

OTHER REFERENCES

Glasstone et al.: "Principles of Nuclear Reactor Engineering," July 1955, pages 638, 639, D. Van Nostrand Co., Inc.

Kay et al.: "Atomics," May 1956, pages 157–159.